US011132707B2

(12) United States Patent
Johnson et al.

(10) Patent No.: US 11,132,707 B2
(45) Date of Patent: Sep. 28, 2021

(54) BLOCKCHAIN SOLUTION FOR AN AUTOMATED ADVERTISING MARKETPLACE

(71) Applicant: AT&T Intellectual Property I, L.P., Atlanta, GA (US)

(72) Inventors: Lars Johnson, Brooklyn, NY (US); Hans Fischmann, Wellesley, MA (US); Cristina Serban, Middletown, NJ (US); Jennifer Morovitz, Ballwin, MO (US); Paul Giura, Cohoes, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 297 days.

(21) Appl. No.: 15/962,124

(22) Filed: Apr. 25, 2018

(65) Prior Publication Data
US 2019/0333096 A1     Oct. 31, 2019

(51) Int. Cl.
*G06Q 30/02* (2012.01)
*H04L 9/06* (2006.01)
(Continued)

(52) U.S. Cl.
CPC ....... *G06Q 30/0248* (2013.01); *H04L 9/0643* (2013.01); *H04L 9/3236* (2013.01);
(Continued)

(58) Field of Classification Search
CPC ........... G06Q 30/0248; G06Q 30/0273; G06Q 2220/00; H04L 9/3239; H04L 63/123;
(Continued)

(56) References Cited

U.S. PATENT DOCUMENTS

| 6,732,366 B1 | 5/2004 | Russo |
| 8,954,588 B1 | 2/2015 | Bertz et al. |

(Continued)

FOREIGN PATENT DOCUMENTS

| WO | 2016127721 A1 | 8/2016 |
| WO | 2017145008 A1 | 8/2017 |

(Continued)

OTHER PUBLICATIONS

University of Chicago, "The Economic Limits of Bitcoin and the Blockchain" by Eric Burdish (Year: 2018).*
(Continued)

*Primary Examiner* — Breffni Baggot
(74) *Attorney, Agent, or Firm* — Guntin & Gust, PLC; Robert Gingher

(57) ABSTRACT

Aspects of the subject disclosure may include, for example, a device, that includes a processing system including a processor, and a memory that stores executable instructions that, when executed by the processing system, facilitate performance of operations, the operations including: creating an initial block in a blockchain, wherein the initial block includes first information describing an advertisement spot generated by a viewer device; adding second information to the initial block that identifies a purchaser of the advertisement spot; calculating a cryptographic hash for the initial block; and sending a copy of the cryptographic hash to a network element of a communications network, wherein the network element records the copy of the cryptographic hash in a hash ledger. Other embodiments are disclosed.

20 Claims, 7 Drawing Sheets

(51) Int. Cl.
*H04L 9/32* (2006.01)
*H04L 29/06* (2006.01)

(52) U.S. Cl.
CPC .......... *H04L 9/3239* (2013.01); *H04L 63/123* (2013.01); *G06Q 30/0273* (2013.01); *G06Q 2220/00* (2013.01); *H04L 2209/38* (2013.01)

(58) Field of Classification Search
CPC . H04L 9/0643; H04L 9/3236; H04L 2209/38; H04L 2209/56
See application file for complete search history.

(56) References Cited

U.S. PATENT DOCUMENTS

| | | | |
|---|---|---|---|
| 9,662,572 | B1 | 5/2017 | Laskar |
| 9,849,364 | B2 | 12/2017 | Tran et al. |
| 9,922,380 | B2 | 3/2018 | Isaacson et al. |
| 2003/0073411 | A1 | 4/2003 | Meade |
| 2005/0210498 | A1 | 9/2005 | Scott et al. |
| 2009/0037963 | A1 | 2/2009 | Murray et al. |
| 2010/0223637 | A1 | 9/2010 | Hubbard |
| 2012/0210343 | A1 | 8/2012 | Mccoy et al. |
| 2014/0122737 | A1 | 5/2014 | Silberstein et al. |
| 2015/0020127 | A1 | 1/2015 | Doshi et al. |
| 2015/0150075 | A1* | 5/2015 | Vahlis .................. G06F 21/602 726/1 |
| 2015/0156525 | A1 | 6/2015 | Lemmons |
| 2017/0132620 | A1 | 5/2017 | Miller et al. |
| 2017/0134161 | A1 | 5/2017 | Goeringer |
| 2017/0169363 | A1 | 6/2017 | Salmasi et al. |
| 2017/0195747 | A1 | 7/2017 | Haberman et al. |
| 2017/0206522 | A1 | 7/2017 | Schiatti et al. |
| 2017/0221032 | A1 | 8/2017 | Mazed et al. |
| 2017/0249623 | A1 | 8/2017 | Cole |
| 2017/0262902 | A1 | 9/2017 | Weston et al. |
| 2017/0300876 | A1 | 10/2017 | Musiala, Jr. et al. |
| 2017/0308928 | A1 | 10/2017 | Weston et al. |
| 2017/0324738 | A1 | 11/2017 | Hari et al. |
| 2017/0358041 | A1 | 12/2017 | Forbes, Jr. et al. |
| 2017/0364936 | A1 | 12/2017 | Balfour et al. |
| 2018/0012262 | A1 | 1/2018 | Gupta et al. |
| 2018/0018695 | A1 | 1/2018 | Gupta et al. |
| 2018/0019984 | A1 | 1/2018 | Isaacson et al. |
| 2018/0053161 | A1 | 2/2018 | Bordash et al. |
| 2018/0078843 | A1 | 3/2018 | Tran et al. |
| 2018/0276626 | A1* | 9/2018 | Laiben ................... G06Q 20/02 |
| 2018/0308134 | A1* | 10/2018 | Manning ............ G06Q 30/0275 |
| 2018/0323979 | A1* | 11/2018 | Ahn ...................... H04L 9/3236 |
| 2019/0108362 | A1* | 4/2019 | Miller .................. G06F 21/6245 |
| 2019/0180368 | A1* | 6/2019 | Payne .................... G06Q 40/04 |
| 2019/0207768 | A1 | 7/2019 | Hardy et al. |
| 2019/0306549 | A1* | 10/2019 | Dietz ................... H04N 21/251 |
| 2020/0052917 | A1 | 2/2020 | Corral et al. |
| 2020/0097994 | A1 | 3/2020 | Seitz et al. |
| 2020/0366950 | A1 | 11/2020 | Manganilla et al. |

FOREIGN PATENT DOCUMENTS

| | | |
|---|---|---|
| WO | 2017145019 A1 | 8/2017 |
| WO | 2017145020 A1 | 8/2017 |
| WO | 2017167548 | 10/2017 |
| WO | 2017187399 A1 | 11/2017 |

OTHER PUBLICATIONS

"Home: The world's first exchange to trade advertising contracts." NYIAX, nyiax.com, accessed: Mar. 2018. https://web.archive.org/web/20161212101141/http://www.nyiax.com:80/; pp. 1-6.

OnXCHNG: The Partner Program, xchng.io, 2018, 1 page.

XCHNG, brought to you by Kochava, Kochava Labs SEZC, 2017-2018, pp. 1-33.

Team, T. V. "Disintermediating the Broadcast Industry by Establishing a Blockchain-Based Television Ecosystem." (2017). https://s3.eu-central-1.amazonaws.com/tvtwo/TV_Whitepaper.pdf; pp. 1-40, Nov. 30, 2017.

McEvily, Nicholas et al., ""An Incentivized, Blockchain Enabled Multimedia Ecosystem."", http://www.planetblockchain.io/img/manjakos/3601516300406.pdf; pp. 1-47, Nov. 29, 2017.

Munson, Ben , ""IBM wants to put Blockchain into the ad buying workflow."", Fierce Cable, fiercecable.com, Oct. 19, 2017. https://www.fiercecable.com/broadcasting/ibm-wants-to-put-blockchain-into-adbuying-workflow; pp. 1-4.

Olenski, Steve , "Why Digital Advertising Needs a Blockchain Solution.", Forbes, forbes.com, Feb. 16, 2018. https://www.forbes.com/sites/steveolenski/2018/02/16/why-digital-advertisingneeds-a-blockchain-solution/; pp. 1-2.

Swant, Marty , ""Can Blockchain Technology Solve Digital Marketing's Ad-Fraud Problems?"", AdWeek, adweek.com, Aug. 6, 2017. http://www.adweek.com/digital/can-blockchain-technology-solve-digital-marketings-ad-fraud-problems/; pp. 1-5.

Wise, Bill, ""For Blockchain to Work in Ad Tech, We Need to Be Honest About the Challenges."", Media Ocean, meadiaocean.com, Aug. 29, 2017. https://web.archive.org/web/20170909012453/http://www.mediaocean.com/blog/blockchain-work-ad-tech-we-need-be-honest-about-challenges; pp. 1-5.

Wright, Aaron et al., ""Decentralized blockchain technology and the rise of lex cryptographia."", https://www.cardozo.yu.edu/sites/default/files/SSRN-id2580664.pdf, Mar. 12, 2015, pp. 1-6.

Zhang, Zheng , ""Five ways blockchain can enhance your ad campaigns."", The Block, blockchaintechnology-new.com, Mar. 21, 2018. https://www.blockchaintechnology-news.com/2018/03/21/five-ways-blockchaincan-enhance-your-ad-campaigns/; pp. 1-4, Mar. 21, 2008.

"Blockchain Scalability: Challenges and Recent Developments", Codementor Blog, Dec. 25, 2018, 32 pages.

"Scaling the Blockchain for Tomorrow's Internet", Jul. 17, 2018, 21 pages.

"Sharding FAQ", on sharding blockchains, Apr. 18, 2019, 39 pages.

"UltraViolet (system)", https://en.wikipedia.org/wiki/UltraViolet_(system), Accessed, Apr. 25, 2019, 9 pages.

Kravchenko, Pavel et al., "Distributed multi-ledger and asset exchange model for the financial industry", Feb. 14, 2020, 14 pages.

Rizun, Peter R., "Subchains: A Technique to Scale Bitcoin and Improve the User Experience", Ledger, vol. 1 (2016), 2016, 9 pages.

* cited by examiner

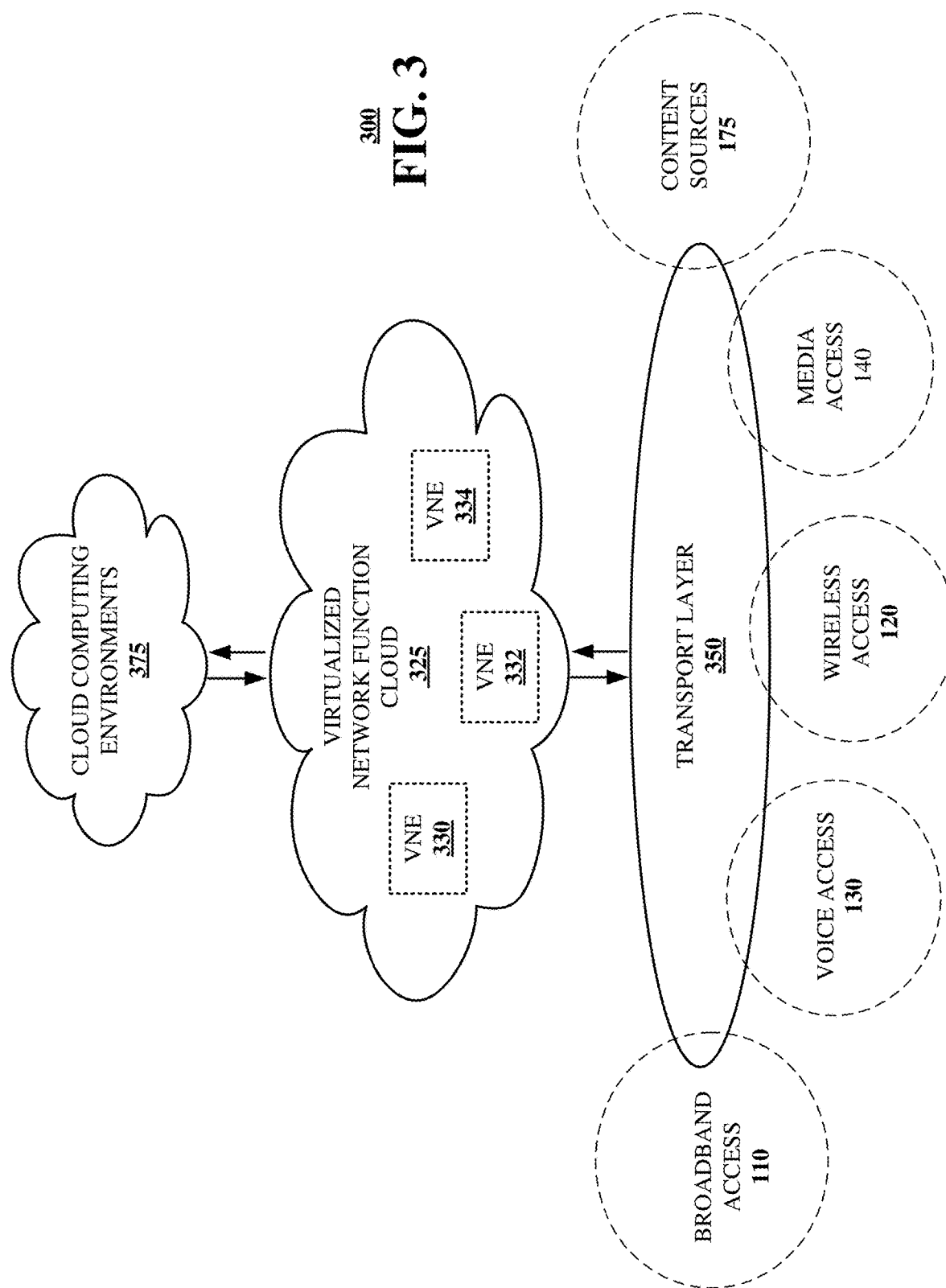

BLOCKCHAIN SOLUTION FOR AN AUTOMATED ADVERTISING MARKETPLACE

FIELD OF THE DISCLOSURE

The subject disclosure relates to a system and method for marketing and providing advertisements to a viewer.

BACKGROUND

In video advertising, the number of unique advertisement spots that can be bought, sold and delivered is growing at an ever increasing rate. As a result, the speed of transactions may not be able to keep up with the placement of available individual advertisement spots, creating inefficiencies for legitimate participants as well as opportunities for bad actors. Online ad sales provide a marketplace fraught with fraud, malicious content and placement opportunities of questionable value.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein;

DETAILED DESCRIPTION

The subject disclosure describes, among other things, illustrative embodiments for a system for facilitating sales of advertisement spots. Other embodiments are described in the subject disclosure.

One or more aspects of the subject disclosure include a device, comprising: a processing system including a processor, and a memory that stores executable instructions that, when executed by the processing system, facilitate performance of operations, the operations including: creating an initial block in a blockchain, wherein the initial block includes first information describing an advertisement spot generated by a viewer device; adding second information to the initial block that identifies a purchaser of the advertisement spot; calculating a cryptographic hash for the initial block; and sending a copy of the cryptographic hash to a network element of a communications network, wherein the network element records the copy of the cryptographic hash in a hash ledger.

One or more aspects of the subject disclosure include a machine-readable medium, comprising executable instructions that, when executed by a processing system including a processor, facilitate performance of operations, the operations comprising: receiving a copy of a cryptographic hash for an initial block in a blockchain, wherein the initial block comprises first information describing an advertisement spot generated by a viewer device and second information that identifies a purchaser of the advertisement spot; and recording the copy of the cryptographic hash in a hash ledger.

One or more aspects of the subject disclosure include a method that includes creating, by a processing system including a processor, an initial block in a blockchain comprising first information describing an advertisement spot generated by a viewer device; adding, by the processing system, second information to the initial block that identifies a purchaser of the advertisement spot; calculating, by the processing system, a cryptographic hash for the initial block; and recording, by the processing system, a copy of the cryptographic hash in a hash ledger.

Figure 1:
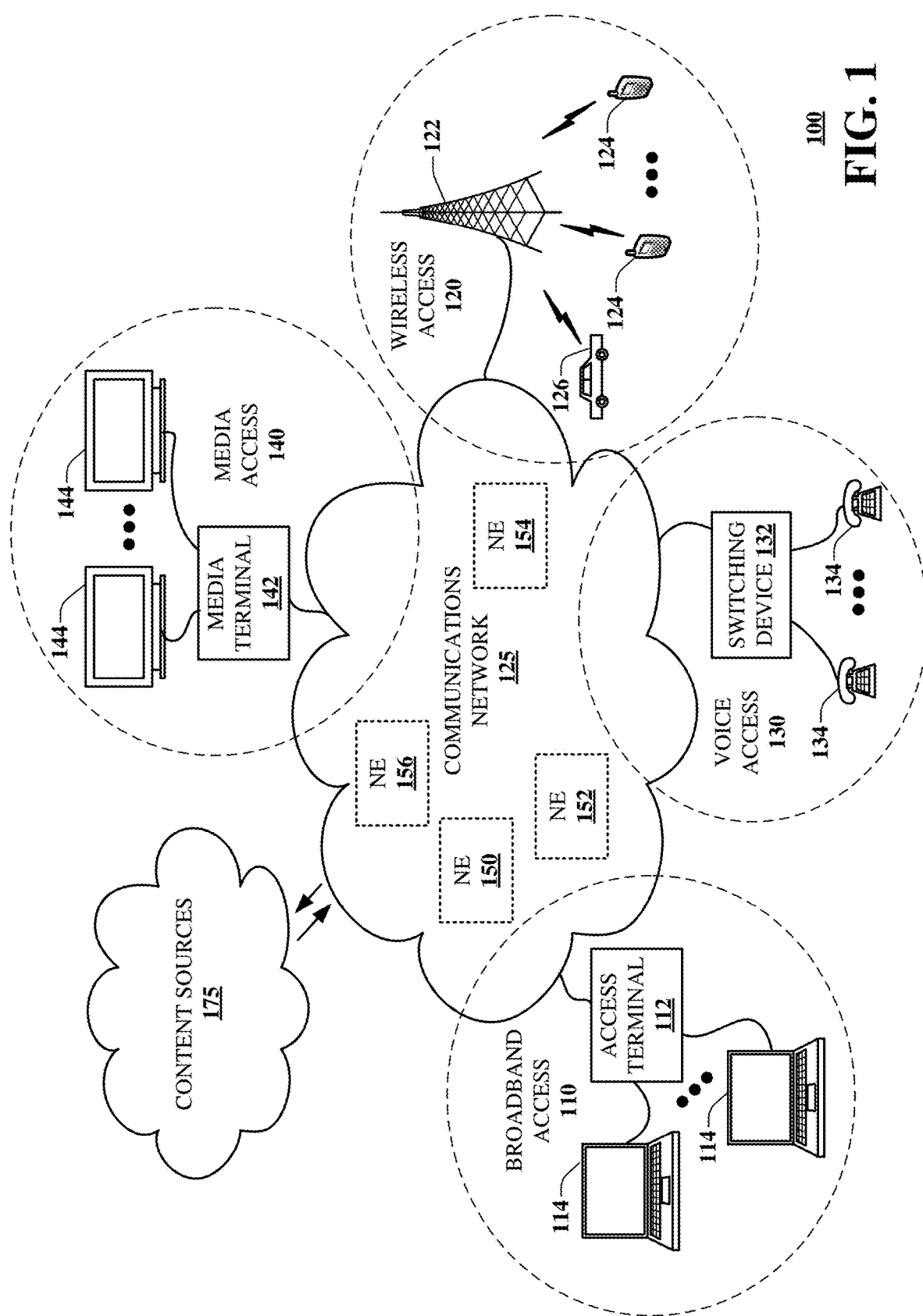
FIG. 1 is a block diagram illustrating an example, non-limiting embodiment of a communications network in accordance with various aspects described herein.

Referring now to FIG. 1, a block diagram is shown illustrating an example, non-limiting embodiment of a communications network 100 in accordance with various aspects described herein. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The audio/video display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
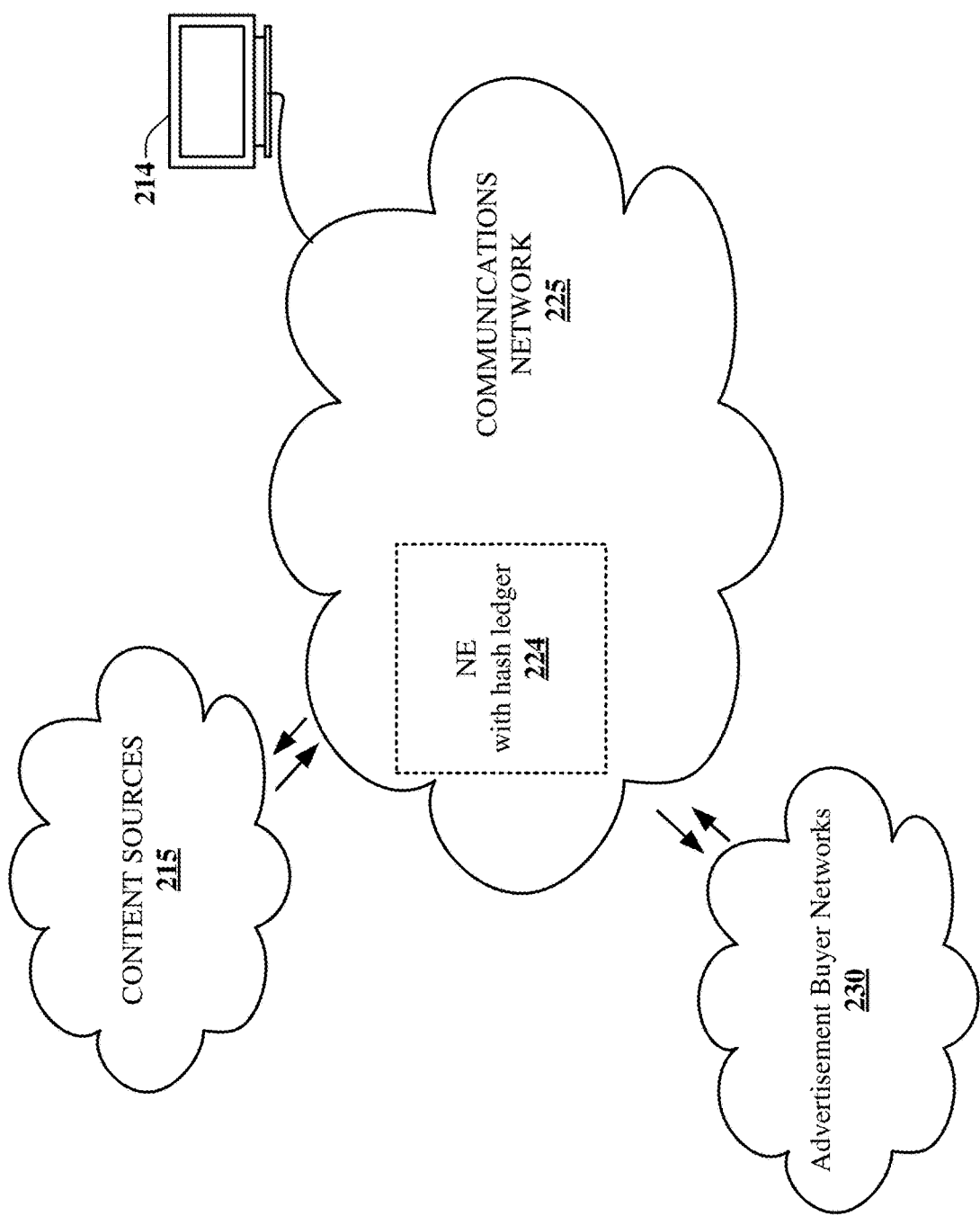
FIG. 2A is a block diagram illustrating an example, non-limiting embodiment of a system for distributing advertisement spots originating in the communication network of FIG. 1 in accordance with various aspects described herein.

FIG. 2A is a block diagram illustrating an example, non-limiting embodiment of a system for distributing advertisement spots originating in the communication network of FIG. 1 in accordance with various aspects described herein. As shown in FIG. 2A, system 200 comprises a communications network 225, a viewer's device 214, one or more content sources 215, and advertisement buyer networks 230. The viewer's device 214 may be used to view content, such as a video, television program, etc., or advertisements, delivered from one or more content sources 215. The viewer's device may be a data terminal 114, a mobile device 124, or an audio/video display device 144 via media terminal 142, as illustrated in FIG. 1. The communications network 225 includes one or more network elements 224 that may comprise a cryptographic hash ledger. The communications network may conduct transactions with entities in the advertisement buyer networks 230, including the sale of advertisement spots, or ad spots, using a blockchain (not illustrated) ledger to record transactions. Entities in the advertisement buyer networks 230 may include ad syndication networks, data owners who have gathered data in the past through some mechanism, data buyers who are simply looking to buy the data in a transaction chain and resell an advertisement spot as best they can, data combiners who identify data within a transaction chain and algorithmically combine information to form better data, etc.

Figure 2B:
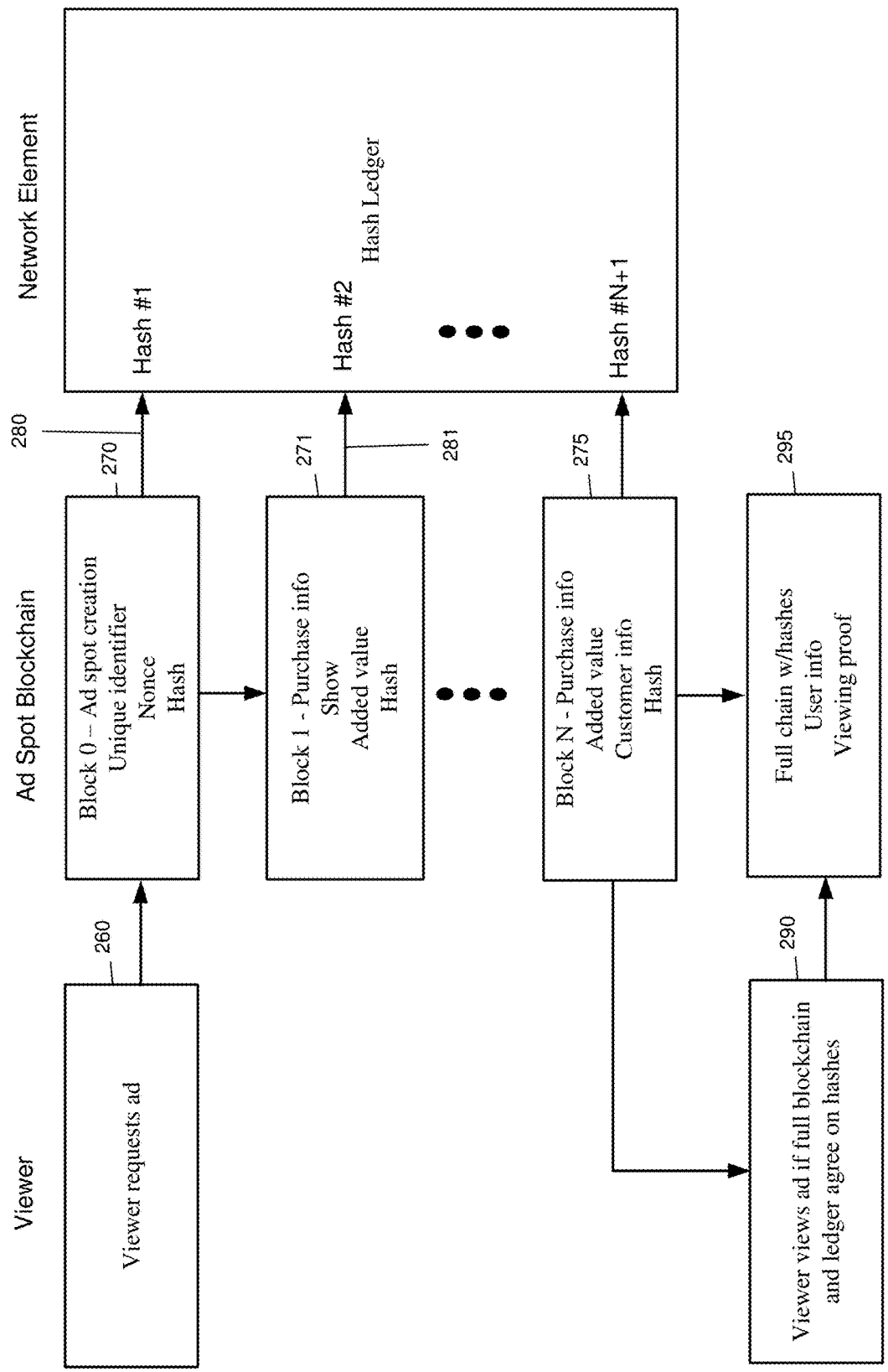
FIG. 2B is a flow diagram illustrating an example, non-limiting embodiment of one or more network element functions and data within the system of FIG. 2A in accordance with various aspects described herein.

FIG. 2B is a flow diagram illustrating an example, non-limiting embodiment of a method 250 performed by one or more network element functions and data within the system 200 of FIG. 2A in accordance with various aspects described herein. As shown in FIG. 2B, method 250 begins in step 260 when a viewer may be viewing content on the viewer's device 214. During said viewing of content, an "impression" becomes available, i.e., a place in the content where an advertisement may be viewed by the viewer, also known as an ad spot. When an ad spot arises, a request is made by a client application (not shown), which is either by software running on the viewer's device 214, or by a network element in the one or more network elements 224 in the communication network 225, to retrieve advertising content.

At such time in step 270, a network element 224 creates a zero block for the ad spot for sale of the ad spot to a member of the advertisement buyer networks 230. An individual blockchain is created for each ad spot, i.e., implemented for each impression (every time a viewer sees an ad it will be the result of a completed and verified blockchain), to provide open information to participants on a given blockchain. The blockchain allows advertising marketers to share information downstream without sharing their information with competitors. Further, the blockchain will provide accountability in the event of malicious, fraudulent, or otherwise unwanted activity. By adding in accountability to the chain, middlemen who add no value will be eliminated, thereby driving advertising costs down while allowing an increase in the initial offering price of the ad spot.

The network element 224 starts creating the blockchain with a zero block, to make an incorruptible digital ledger of transactions that can be programmed to record the purchase and sale of the ad spot. The zero block includes a unique identifier known to the communications network that is associated with the viewer, an identifier for the viewer that maintains the anonymity of the viewer. The zero block also includes a random nonce to prevent decoding the unique identifier. The network element 224 determines a cryptographic hash for the zero block. Then the network element 224 records the cryptographic hash in a hash ledger in step 280, which is maintained by the one or more network elements 224 in the communication network 225.

Next in step 271, the network element 224 creates information for a first block appended to the block chain. The first block serves as an offer to sell the ad spot to potential buyers in the advertisement buyer networks 230. Information recorded in the first block at creation may include show information about the show where the ad spot occurs, information describing the ad spot, and added value information about the viewer. The show information may include a program identifier, channel identifier, channel name, and the local date and time of the ad spot. The added value information may include all of the background information of the viewer known to the communications network, i.e., personal information that can be shared with advertisers and content providers without having to compromise the viewer's privacy, such as age, gender, geography, or other demographic information. The information describing the ad spot may include information such as the size, format, and duration of the ad spot.

Potential purchasers add their identifier to the first block, along with a cryptographic hash for the first block, and send their copy of the first block back to the network element 224. The network element 224 then selects the purchaser for the ad spot. Such selection may be based on the price provided by the potential purchaser in the first block.

In one embodiment, the advertisement buyer networks 230 comprise an online auction style marketplace, where the ad spot is awarded to the highest bidder. In another embodiment, credits or digital currency amounts can be recorded in the first block, indicating the sale price of the ad spot.

In an embodiment, smart contracts are used to facilitate faster transaction time. Every bidder can submit a completed smart contract, and then acceptance of the highest value smart contract will complete the transaction, thereby removing any unnecessary steps. Such smart contracts are not ad futures, as defined in other systems, where offers are bid on a potential ad spot, but rather a bid for an actual, upcoming ad spot.

Once a purchaser of the ad spot is determined, in step 281, the network element 224 records the cryptographic hash for the first block in the hash ledger. Then the network element 224 provides permission to the purchaser, now owner, of the ad spot to enable recording a cryptographic hash of a subsequent block to the hash ledger by the owner. Permissions for writing to the hash ledger may be implemented with a public/private key infrastructure (PKI), where a key permitting the recording of a new hash value to the hash ledger is encrypted by the network element 224 using the public key of the owner, and distributed to the owner by the network element 224. In an embodiment, the network element 224 also reveals the unique identifier of the viewer to the owner.

Next, when the owner decides to sell the ad spot, the owner creates another block in the blockchain. The new block includes the cryptographic hash value for the previous (first) block, an identifier for the seller of the ad spot, additional information about the viewer of the ad spot (i.e., added value), and receives information including the identity of the purchaser of the ad spot, the price for the ad spot, as well as a cryptographic hash of the block. Once the owner has sold the ad spot, the added value remains visible, but the new owner possesses the block chain, and may control who will be shown the information contained therein. A seller may verify that only new participants can bid on an ad spot, so as not to reveal data to bidders that may already know the unique ID of the viewer for a given block chain. In an embodiment, the seller may encrypt the added value with the public key of the purchaser, so that only the purchaser may gain access to this information by decryption using the purchaser's secret private key. In another embodiment, the seller may encrypt the added value with the seller's private key, so that only entities that have been given the seller's public key may gain access to this information by decryption. The owner sends a copy of the cryptographic hash back to the network element 224 using PKI, so that the cryptographic hash may be recorded in the hash ledger maintained by the network element 224 of the communication network 225.

The blockchain creates an immutable list of ownership providing analysts perfect data in the event of malicious content being delivered. The blockchain method creates a reliable identification of possession of the ad spot for analysis in the event of a malicious incident—which should deter malicious content. By creating a safe ecosystem to sell ads, the online auction style marketplace can process ads at rates required for addressable advertising.

Every time ownership of an ad spot is transferred, a new block is appended to the blockchain. Each subsequent owner creates the new block to document the sale, and records a copy of the cryptographic hash value for the new block for recording in the hash ledger.

At any time, a potential acquirer can verify the integrity of the block by requesting a copy of the hash values in the hash ledger and comparing the hash values in the block with that recorded in the hash ledger, thus ensuring the immutability of the data and preventing a fraudulent transaction. Furthermore, the use of a separate hash ledger, maintained by a trusted entity in a semi-private fashion is distinguishable from more traditional, public blockchain technology that require complex cryptographic hash generation and greater latency (e.g., approximately ten minutes per block for bitcoin). The use of simple cryptographic hash generation algorithms reduces latency and ensures that transactions can be rapidly recorded and meet the demand of prevailing real-time ad marketplaces, which process roughly 5 million transactions per second. Unlike proof of work incorporated into the trustless consensus of the bitcoin scheme, which creates a blockchain that must remain unaltered forever, a simple cryptographic hash is sufficient to prevent fraud, since the ad spot is a perishable good that expires after the occurrence of the ad spot.

This process is repeated until the final transfer of the ad spot, creates the last block N in step 275, and records the cryptographic hash N+1 for the blockchain in the hash ledger. The last transaction block N indicates that the ad spot belongs to the owner/advertiser that provides the advertisement. The owner/advertiser reports the location of blockchain and the advertisement, such as a uniform resource locator (URL) or the like, to the network element 224. In an embodiment, the network element 224 downloads a copy of the advertisement from the URL provided. The viewer will request the hash ledger from the ad spot creator, and gather the blockchain location.

In an embodiment, implementing smart contracts may further improve the system in the event that an advertisement is not presented during an ad spot. The original cost paid to the ad spot creator can be refunded to the last recorded owner of the ad spot, as documented by the blockchain. In other words, the cost of an ad spot can be broken down into two parts: the original cost for the ad spot, and the incremental costs of added value (i.e., data) provided by each of the resellers. The ad spot creator may refund the original cost of the ad spot, however the cost of the added value created by all the participants in the transaction chain, and ultimately purchased by the last recorded owner. In such event, the ad spot is no longer needed, and the original funds received for the ad spot can be automatically returned to the ultimate buyer. Furthermore, smart contracts can handle other contingencies, such as when the ad spot disappears before the ad can be provided, e.g., when a viewer changes a channel, stops watching the content, fast forwards, mutes, etc.

Next in step 290, the client application will request the cryptographic hash values for the full blockchain from the hash ledger, and compares the cryptographic hash values with those found in the full block chain, (including the ad URL). In an embodiment, the client application may maintain a log of this activity for later analysis as needed/desired. If all of the cryptographic hash values agree, then the client application retrieves the advertisement for presentation to the viewer.

Next, in step 295, information may be appended to the blockchain that provides proof that the client application provided the advertisement to the viewer, including analytics on the viewing data from the ad.

In an embodiment, digital currencies may be used to pay for the purchase of the ad spot. In another embodiment, smart contracts may be used to sell futures on ad spots. In yet another embodiment, voting systems may be built into the blockchain to indicate confirmation of transactions. In yet another embodiment, blocks in the blockchain are released to purchasers identified in the blockchain, but are not shared with actors outside of the blockchain. In another embodiment, ad spots may comprise short video ads of ten seconds or less, or maybe even logos that are briefly displayed.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and method 250 presented in FIGS. 1, 2A, 2B and 3, such as, but without limitation, the NE 224 comprising the hash ledger.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a virtual network element 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 330, 332 or 334. These network elements can be included in transport layer 350.

The virtualized network function cloud 325 interfaces with the transport layer 350 to provide the virtual network elements (VNE) 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, virtualized network elements 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributors and other network elements in a distributed processing environment. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNE 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
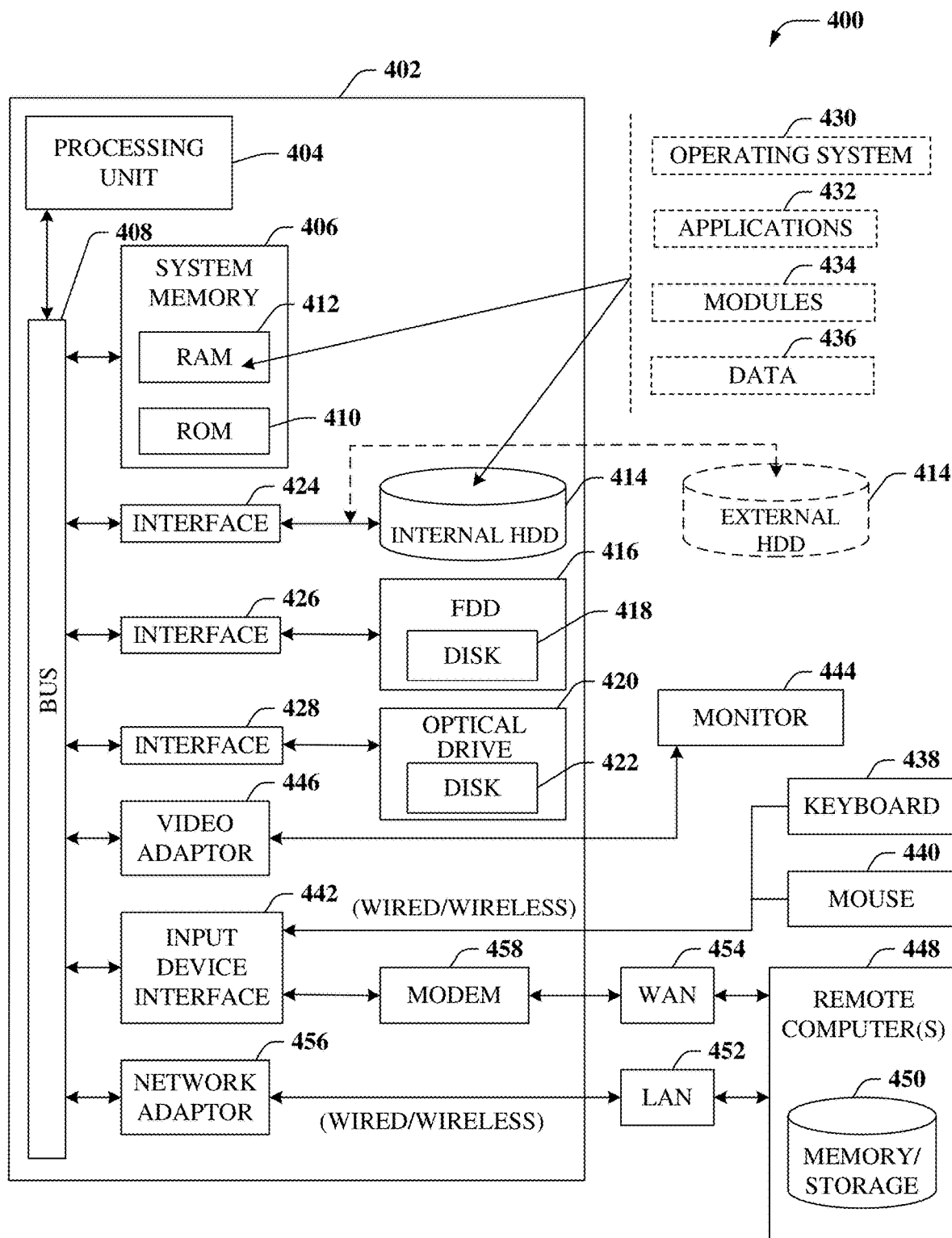
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, computers acting as content sources in the content source network 215, NE 224, client devices attached to communications network 225, computers in the advertisement buyer networks 230 and/or virtual network elements 330, 332, 334, etc. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal hard disk drive 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drive 414, magnetic disk drive 416 and optical disk drive 420 can be connected to the system bus 408 by a hard disk drive interface 424, a magnetic disk drive interface 426 and an optical drive interface 428, respectively. The interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the local network 452 through a wired and/or wireless communication network interface or adapter 456. The adapter 456 can facilitate wired or wireless communication to the LAN 452, which can also comprise a wireless AP disposed thereon for communicating with the wireless adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
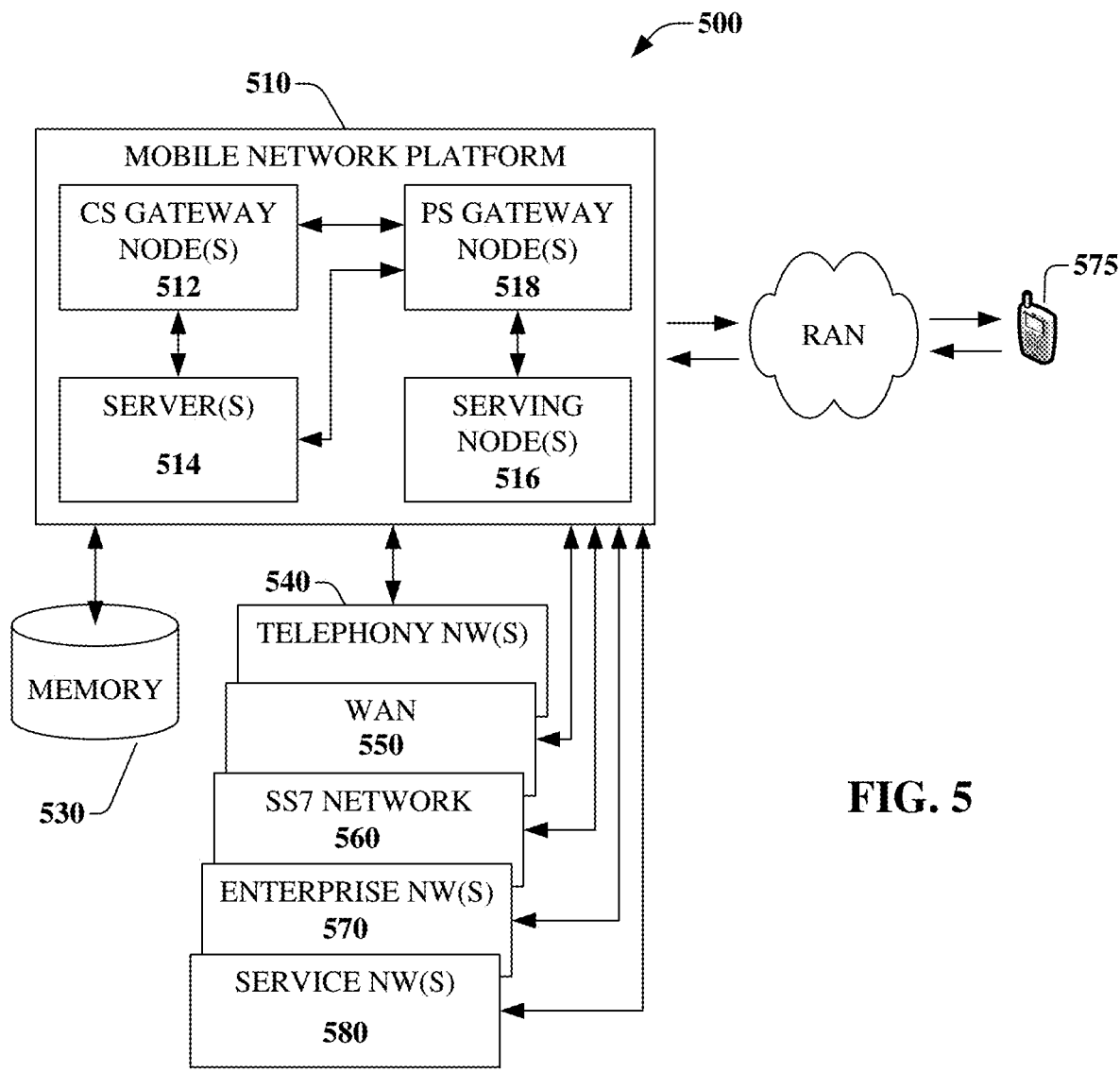
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, NE 224, and/or virtual network elements 330, 332, 334, etc. In one or more embodiments, the mobile network platform 510 can generate and receive signals transmitted and received by base stations or access points such as base station or access point 122. Generally, wireless network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 570. Circuit switched gateway node(s) 512 can authorize and authenticate traffic (e.g., voice) arising from such networks. Additionally, CS gateway node(s) 512 can access mobility, or roaming, data generated through SS7 network 570; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the wireless network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 560 can embody, at least in part, a service network(s) like IP multimedia subsystem (IMS). Based on radio technology layer(s) available in technology resource(s), packet-switched gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, wireless network platform 510 also comprises serving node(s) 516 that, based upon available radio technology layer(s) within technology resource(s), convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in wireless network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to wireless network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of macro wireless network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of wireless network platform 510. Other operational information can comprise provisioning information of mobile devices served through wireless platform network 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, enterprise network(s) 570, or SS7 network 560. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
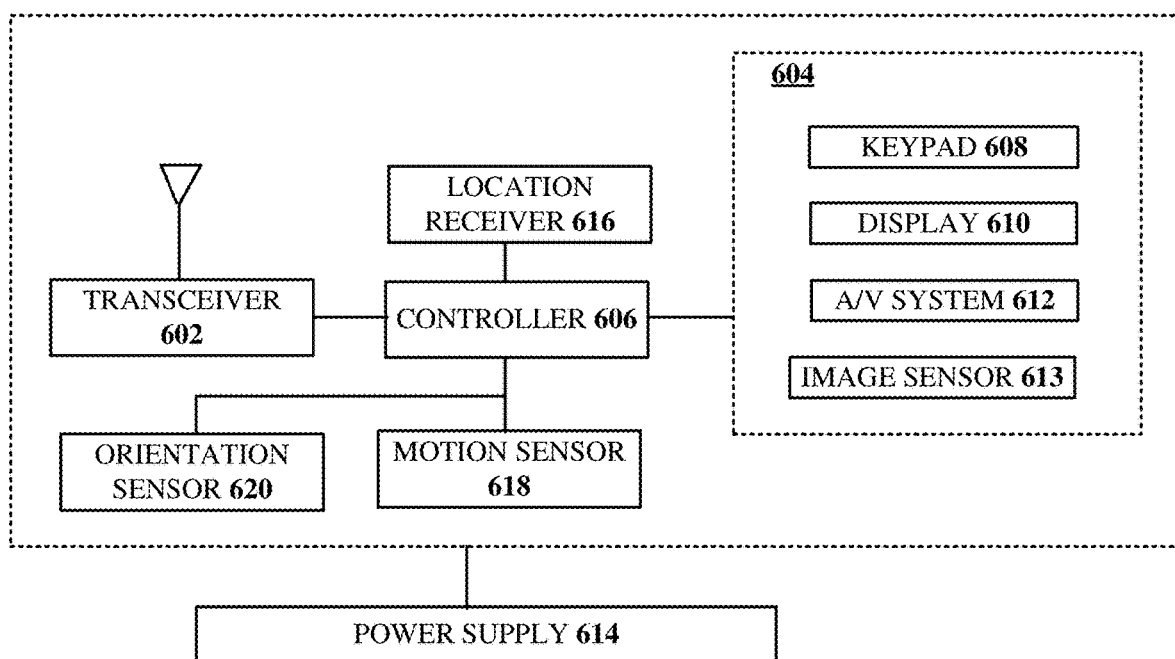
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, audio/video display devices 144 or other client devices for communication via either communications network 125 or viewer's device 214 or other client devices for communication via communications network 225.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to diagnose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
creating a block in a blockchain comprising first information describing an advertisement spot generated by a viewer device;
adding second information to the block that identifies a purchaser of the advertisement spot;
calculating a cryptographic hash for the block; and
sending a copy of the cryptographic hash to a network element of a communications network, wherein the network element records the copy of the cryptographic hash in a hash ledger for the blockchain, wherein the hash ledger is only accessible as permitted by the network element, wherein the hash ledger is maintained separate from the blockchain, wherein the network element does not distribute the hash ledger, and wherein the network element updates permissions in the hash ledger permitting the purchaser to update the hash ledger.

2. The device of claim 1, wherein the first information comprises a size of the advertisement spot, a format of the advertisement spot, a duration of the advertisement spot, or a combination thereof.

3. The device of claim 1, wherein the operations further comprise adding third information to the block, wherein the third information includes information about the viewer device.

4. The device of claim 3, wherein the third information comprises demographic information about a user of the viewer device, an identifier for the user of the viewer device, or a combination thereof, wherein the identifier maintains anonymity of the user.

5. The device of claim 3, wherein the viewer device comprises a data terminal, a mobile device, or an audio/video display device.

6. The device of claim 1, wherein the operations further comprise sending the block to the purchaser of the advertisement spot.

7. The device of claim 1, wherein the network element records a copy of a subsequent cryptographic hash in the hash ledger, wherein the subsequent cryptographic hash corresponds to a subsequent block in the blockchain, and wherein the subsequent cryptographic hash is generated by a simple cryptographic hash generation algorithm without proof of work, thereby reducing latency.

8. The device of claim 7, wherein the subsequent block comprises information including a subsequent purchaser of the advertisement spot.

9. The device of claim 1, wherein the operations further comprise:
receiving a copy of the blockchain and locating information for an advertisement;
comparing a copy of cryptographic hash values recorded in the hash ledger with cryptographic hash values recorded in the blockchain; and
responsive to a determination that the comparing of the cryptographic hash values is identical, providing the advertisement to the viewer device.

10. The device of claim 9, wherein the operations further comprise: sending data indicating whether the advertisement was displayed by the viewer device.

11. The device of claim 1, wherein the processing system comprises a plurality of processors operating in a distributed processing environment.

12. A machine-readable medium, comprising executable instructions that, when executed by a processing system including a processor, facilitate performance of operations, the operations comprising:
receiving a copy of a cryptographic hash for a block in a blockchain, wherein the block comprises first information describing an advertisement spot generated by a viewer device and second information that identifies a purchaser of the advertisement spot;
recording the copy of the cryptographic hash in a hash ledger for the blockchain;
maintaining the hash ledger separately from the blockchain, wherein the hash ledger is not distributed; and
updating permissions in the hash ledger permitting the purchaser to update the hash ledger.

13. The machine-readable medium of claim 12, wherein the operations further comprise:
receiving a copy of a subsequent cryptographic hash, wherein the subsequent cryptographic hash corresponds to a subsequent block in the blockchain, wherein the subsequent block comprises information including a subsequent purchaser of the advertising spot and a seller of the advertising spot; and
recording the copy of the subsequent cryptographic hash in the hash ledger.

14. The machine-readable medium of claim 13, wherein the operations further comprise:
receiving a copy of the blockchain;
comparing a copy of cryptographic hash values recorded in the hash ledger with cryptographic hash values recorded in the blockchain; and
providing a message indicating whether the cryptographic hash values in the blockchain are identical to the cryptographic hash values recorded in the blockchain.

15. The machine-readable medium of claim 14, wherein the operations further comprise:
receiving a request for a copy of the cryptographic hash values recorded in the hash ledger; and
providing the copy of the cryptographic hash values responsive to the request.

16. The machine-readable medium of claim 15, wherein the processing system comprises a plurality of processors operating in a distributed processing environment.

17. A method, comprising:
creating, by a processing system including a processor, a block in a blockchain comprising first information describing an advertisement spot generated by a viewer device;
adding, by the processing system, second information to the block that identifies a purchaser of the advertisement spot;
calculating, by the processing system, a cryptographic hash for the block, wherein the cryptographic hash is generated by a simple cryptographic hash generation algorithm without proof of work, thereby reducing latency; and
recording, by the processing system, a copy of the cryptographic hash in a hash ledger for the blockchain, wherein a network element maintains the hash ledger separate from the blockchain, and wherein the network element updates permissions in the hash ledger permitting the purchaser to update the hash ledger.

18. The method of claim 17, wherein the first information comprises a size of the advertisement spot, a format of the advertisement spot, a duration of the advertisement spot, or a combination thereof.

19. The method of claim 18, further comprising adding, by the processing system, third information to the block, wherein the third information comprises demographic information about a user of the viewer device, an identifier for the user of the viewer device, or a combination thereof, wherein the identifier maintains anonymity of the user.

20. The method of claim 19, further comprising:
encrypting, by the processing system, the third information with an encryption key before the adding the third information to the block;
sending, by the processing system, a decryption key for the third information to the purchaser; and
recording, by the processing system, a copy of a subsequent cryptographic hash in the hash ledger, wherein the subsequent cryptographic hash corresponds to a subsequent block in the blockchain.

* * * * *